United States Patent
Mednik

(10) Patent No.: US 9,698,689 B2
(45) Date of Patent: Jul. 4, 2017

(54) ZERO-VOLTAGE SWITCHING BUCK CONVERTER AND CONTROL CIRCUIT THEREFOR

(71) Applicant: Microchip Technology Incorporated, Chandler, AZ (US)

(72) Inventor: Alexander Mednik, Campbell, CA (US)

(73) Assignee: Microchip Technology Inc., Chandler, AZ (US)

( * ) Notice: Subject to any disclaimer, the term of this patent is extended or adjusted under 35 U.S.C. 154(b) by 0 days.

(21) Appl. No.: 15/088,789

(22) Filed: Apr. 1, 2016

(65) Prior Publication Data
US 2016/0301310 A1    Oct. 13, 2016

Related U.S. Application Data

(60) Provisional application No. 62/144,790, filed on Apr. 8, 2015.

(51) Int. Cl.
| | |
|---|---|
| *H02M 3/158* | (2006.01) |
| *H02M 1/34* | (2007.01) |
| *H02M 1/00* | (2006.01) |

(52) U.S. Cl.
CPC ............ *H02M 3/158* (2013.01); *H02M 1/34* (2013.01); *H02M 2001/0009* (2013.01)

(58) Field of Classification Search
CPC .... H02M 3/156–3/158; H02M 3/1584; H02M 3/1588; H02M 2001/0009; G05F 1/56; G05F 1/565; G05F 1/573; G05F 1/575; Y02B 70/1466

USPC .................................................. 323/271–285
See application file for complete search history.

(56) References Cited

U.S. PATENT DOCUMENTS

| | | | | |
|---|---|---|---|---|
| 5,636,114 A | * | 6/1997 | Bhagwat ................. | H02M 1/34 363/56.12 |
| 5,943,224 A | * | 8/1999 | Mao ........................ | H02M 1/34 363/52 |
| 6,005,782 A | * | 12/1999 | Jain ......................... | H02M 1/34 323/235 |
| 6,434,029 B1 | * | 8/2002 | Cyr ......................... | H02M 1/34 323/222 |

(Continued)

*Primary Examiner* — Yemane Mehari
(74) *Attorney, Agent, or Firm* — Burr & Forman LLP; Ryan M. Corbett

(57) ABSTRACT

A zero-voltage switching buck converter circuit and control circuit are provided. The buck converter circuit may include a first inductor, a smoothing capacitor coupled to the first inductor, a rectifier diode coupled in parallel with the first inductor and the smoothing capacitor, a control switch coupled to the first inductor, a control circuit configured to turn the control switch off and on repeatedly at a high frequency rate; and a snubber network coupled to the first inductor and the control circuit. The snubber network may include second and third inductors connected in series, wherein one terminal of the first inductor is connected to a node connecting the second and third inductors, and an auxiliary switch connected to the control circuit. A first terminal of the second inductor that is not connected to the node may be coupled to the control switch, and a first terminal of the third inductor that is not connected to the node may be coupled to the auxiliary switch.

12 Claims, 5 Drawing Sheets

(56) References Cited

U.S. PATENT DOCUMENTS 6,462,962 B1* 10/2002 Cuk .................... H02M 1/34
363/131
2002/0110012 A1* 8/2002 Liu .................. H02M 1/4208
363/127

* cited by examiner

ZERO-VOLTAGE SWITCHING BUCK CONVERTER AND CONTROL CIRCUIT THEREFOR

CROSS REFERENCE TO RELATED APPLICATION

This application claims the benefit of U.S. Provisional Patent Application No. 62/144,790, filed on Apr. 8, 2015, which is incorporated herein by reference in its entirety.

TECHNICAL FIELD

The exemplary embodiments disclosed herein generally relate to a buck converter and a control circuit therefor. According to an aspect of one or more exemplary embodiments, the buck converter may reduce power loss and improve power efficiency by exhibiting zero-voltage switching transitions of active switches and soft reverse recovery of all rectifier diodes.

SUMMARY

According to an aspect of one or more exemplary embodiments, there is provided a buck converter circuit that may include a first inductor, a smoothing capacitor coupled to the first inductor, a rectifier diode coupled in parallel with the first inductor and the smoothing capacitor, a control switch coupled to the first inductor, a control circuit configured to turn the control switch off and on repeatedly at a high frequency rate; and a snubber network coupled to the first inductor and the control circuit.

The snubber network may include second and third inductors connected in series, wherein one terminal of the first inductor is connected to a node connecting the second and third inductors, and an auxiliary switch connected to the control circuit. A first terminal of the second inductor that is not connected to the node may be coupled to the control switch, and a first terminal of the third inductor that is not connected to the node may be coupled to the auxiliary switch.

The first terminal of the second inductor may be connected to the anode of the rectifier diode.

The snubber network may also include a snubber capacitor, having a first terminal connected to the first terminal of the second inductor, and a second terminal connected to the first terminal of the third inductor.

The snubber network may also include first and second auxiliary rectifier diodes connected in series with the auxiliary switch. The second terminal of the snubber capacitor may be connected to a node between the first and second auxiliary rectifier diodes.

The second terminal of the snubber capacitor may be connected to the first terminal of the third inductor via the first auxiliary rectifier diode.

According to another aspect of one or more exemplary embodiments, there is provided a buck converter circuit including a coupled inductor having a primary winding and a secondary winding wired in series in opposite polarity, a smoothing capacitor coupled to the coupled inductor, a rectifier diode coupled in parallel with the coupled inductor and the smoothing capacitor, a control switch coupled to the coupled inductor, a control circuit configured to turn the control switch off and on repeatedly at a high frequency rate, and a snubber network coupled to the coupled inductor and the control circuit.

The snubber network may include an auxiliary switch connected to the control circuit and to the secondary winding of the coupled inductor.

The snubber network may also include a snubber capacitor having a first terminal connected to the primary winding of the coupled inductor and a second terminal connected to the auxiliary switch.

The buck converter may also include a first current sense resistor coupled to the control switch, a first comparator coupled to the first current sense resistor and the control circuit, the first comparator receiving a first reference signal as an input, a blocking diode coupled to the auxiliary switch and a secondary winding of the coupled inductor, a clamp diode coupled to the secondary winding of the coupled inductor, a second current sense resistor coupled to the clamp diode, and a second comparator coupled to the second current sense resistor and the control circuit, the second comparator receiving a second reference signal as an input.

The second current sense resistor may be coupled to the first current sense resistor.

The control circuit may receive as inputs a voltage signal from the first current sense resistor, an output signal from the first comparator, and an output signal from the second comparator.

DETAILED DESCRIPTION OF EXEMPLARY EMBODIMENTS

Figure 1:
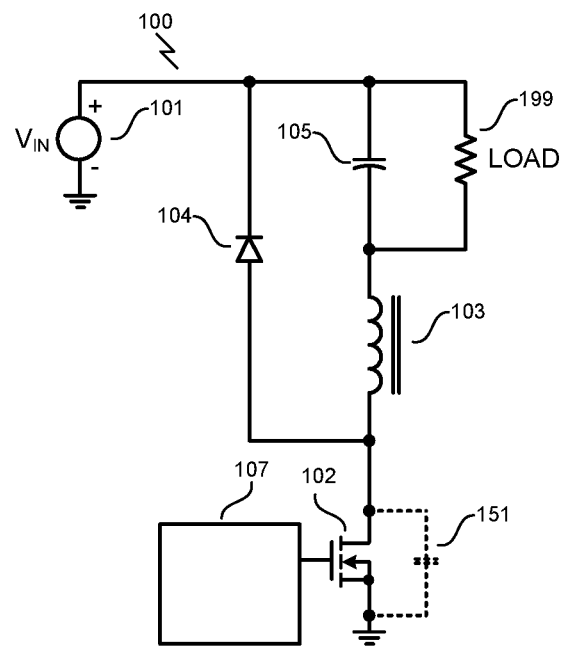
FIG. 1 depicts a buck converter according to the related art.

Reference will now be made in detail to the following exemplary embodiments, which are illustrated in the accompanying drawings, wherein like reference numerals refer to like elements throughout. The exemplary embodiments may be embodied in various forms without being limited to the exemplary embodiments set forth herein. Descriptions of well-known parts are omitted for clarity.

FIG. 1 depicts a related-art buck converter 100 with a low-side control switch for receiving power from a source 101 of voltage $V_{IN}$ and delivering power to a load 199. The converter 100 comprises a control switch 102 having output capacitance 151, an inductor 103, a rectifier diode 104, a smoothing capacitor 105, and a control circuit 107 for turning the control switch 102 on and off repeatedly at a high frequency rate. In continuous conduction mode (CCM) of the inductor 103, the converter 100 exhibits significant power losses due to switching transitions of the switch 102. These power losses are aggravated by parasitic characteristics of the converter 100 such as finite reverse-recovery time of the diode 104 and output capacitance 151 of the control switch 102. Therefore, a buck converter is needed where switching transitions of the switch 102 occur at substantially zero voltage, and where recovery of the diode 104 occurs without significant power loss.

Figure 2:
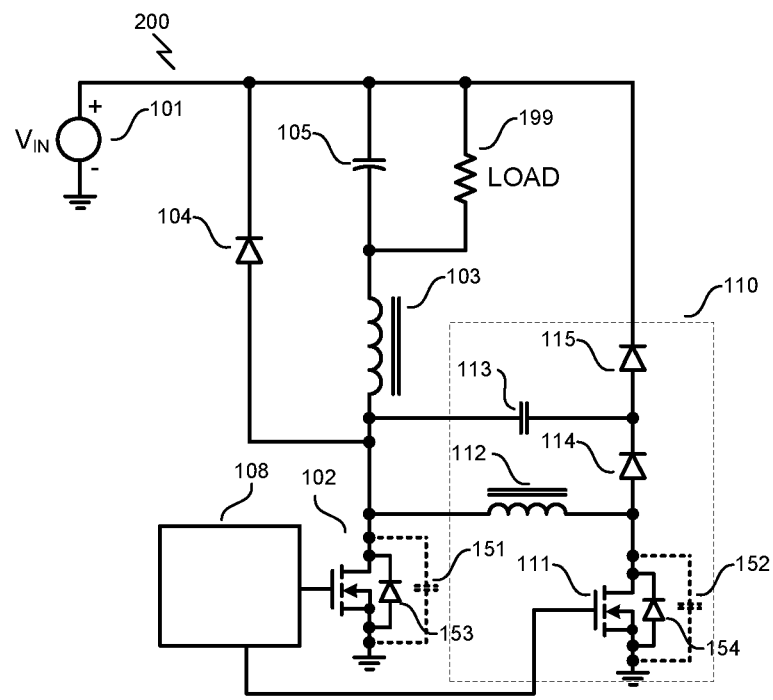
FIG. 2 depicts another buck converter according to the related art.

FIG. 2 shows a prior art buck converter 200 proposed in U.S. Pat. No. 5,841,268 by Mednik resolving the deficiencies of the converter 100 of FIG. 1. The converter 200 additionally comprises an active snubber network 110 including: a second inductor 112; an auxiliary switch 111 with a body diode 154; the auxiliary switch 111 having output capacitance 152; a snubber capacitor 113; a first auxiliary rectifier diode 114; and a second auxiliary rectifier diode 115. In the converter 200, the control circuit 107 of FIG. 1 is replaced by a control circuit 108 for turning the switches 102 and 111 on and off repeatedly at a high frequency rate. A diode 153 represents a body diode of the switch 102.

Figure 3:
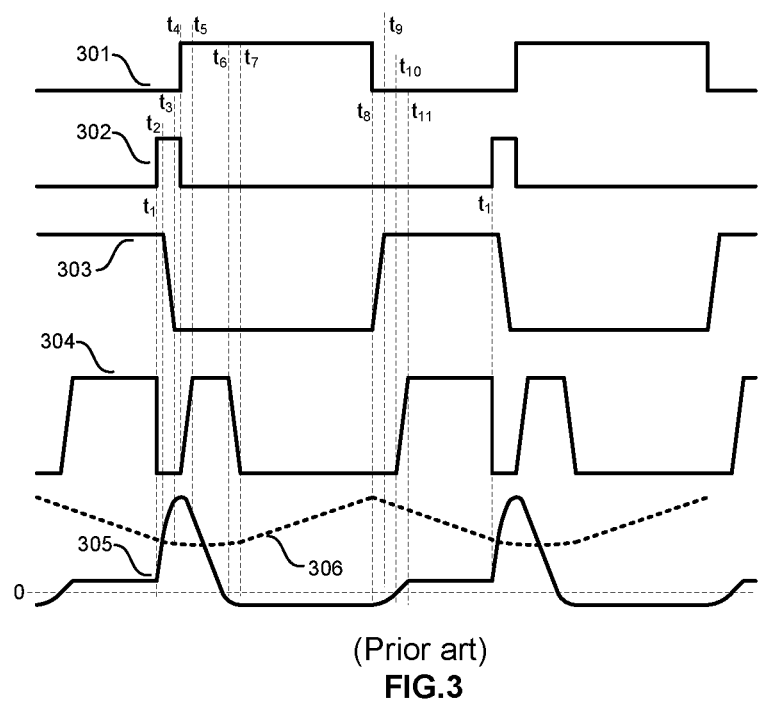
FIG. 3 depicts a waveform diagram illustrating the operation of the buck converter of FIG. 2.

Operation of the converter 200 of FIG. 2 can be illustrated by the waveform diagram in FIG. 3, including: a gate voltage waveform 301 of the control switch 102; a gate voltage waveform 302 of the auxiliary switch 111; a drain voltage waveform 303 of the control switch 102; a drain voltage waveform 304 of the auxiliary switch 111; a current waveform 305 of the second inductor 112; and a current waveform 306 of the inductor 103. The waveforms 305 and 306 use the same scale.

In operation, prior to a moment $t_1$, the diode 104 conducts current of the inductor 103 to the load 199 and the smoothing capacitor 105. The switches 102 and 111 are off with their output capacitances 151 and 152 charged to $V_{IN}$. The diodes 114 and 115 conduct residual current of the inductor 112. The capacitor 113 is discharged.

At the moment $t_1$, the gate voltage 302 becomes high, and the auxiliary switch 111 turns on. The current 305 in the inductor 112 begins ramping up. The current in the diode 104 is composed of a difference between the currents 306 and 305. At a moment $t_2$, the current 305 exceeds the current 306 in inductor 103, and the diode 104 becomes reverse-biased. Hence, recovery of the diode 104 occurs without power loss.

Following the moment $t_2$, output capacitance 151 of the switch 102 is discharged from $V_{IN}$ to zero without power loss, while current 305 in the inductor 112 is reaching its peak magnitude.

At a moment $t_3$, the inductor 112 becomes shorted via the conducting auxiliary switch 111 and the body diode 153 of the switch 102. Its current 305 is "free-wheeling".

At a moment $t_4$, the gate voltage 301 becomes high, and the switch 102 turns on at substantially zero voltage across it. Following the moment $t_4$, the gate voltage 302 becomes low, and the switch 111 turns off without power loss. The current 305 of the inductor 112 is diverted into the capacitor 113 via the diode 114. The voltage 304 at the switch 111 ramps up from zero to $V_{IN}$ at a slew rate dictated by the value of the capacitor 113.

At a moment $t_5$, the diode 115 conducts, returning energy stored in the inductor 112 back to the input source 101. The current 305 ramps down.

At the moment $t_6$, the current 305 reverses its direction and the diodes 114 and 115 turn off. The output capacitance 152 of the switch 111 begins discharging from $V_{IN}$ to zero, while the current 305 in the inductor 112 swings negative.

At a moment $t_7$, the inductor 112 becomes shorted via the conducting control switch 102 and the body diode 154 of the switch 111. Its current 305 is "free-wheeling" in the opposite direction. The current 306 in the inductor 103 ramps up.

At the moment $t_8$, the gate voltage 301 becomes low, and the control switch 102 turns off without power loss. The currents 305 and 306 are diverted into the capacitor 113 via the diode 115. The voltage 303 at the switch 102 ramps up from zero to $V_{IN}$ at a slew rate dictated by the value of the capacitor 113.

At the moment $t_9$, the capacitor 113 becomes discharged fully, and the diode 104 conducts. The energy of the inductor 112 is returned to the input source 101 via the diode 104 and the body diode 154. The current 306 in the inductor 103 starts ramping down.

At the moment $t_{10}$, the current 305 reverses its direction, and the body diode 154 becomes reverse-biased. The output capacitance 152 of the switch 111 starts charging from zero to $V_{IN}$, while the current 305 in the inductor 112 swings positive.

At the moment $t_{11}$, the inductor 112 becomes shorted via the diodes 104, 114, and 115. Its current 305 is "free-wheeling" at a residual positive magnitude. This residual current is undesirable, since, at the moment $t_1$, the diode 114 exhibits hard reverse recovery causing power loss.

Thus, a modification of the converter 200 is needed providing reset of the current 305 to zero prior to the turn-on of the auxiliary switch 111 at the moment $t_1$.

Figure 4:
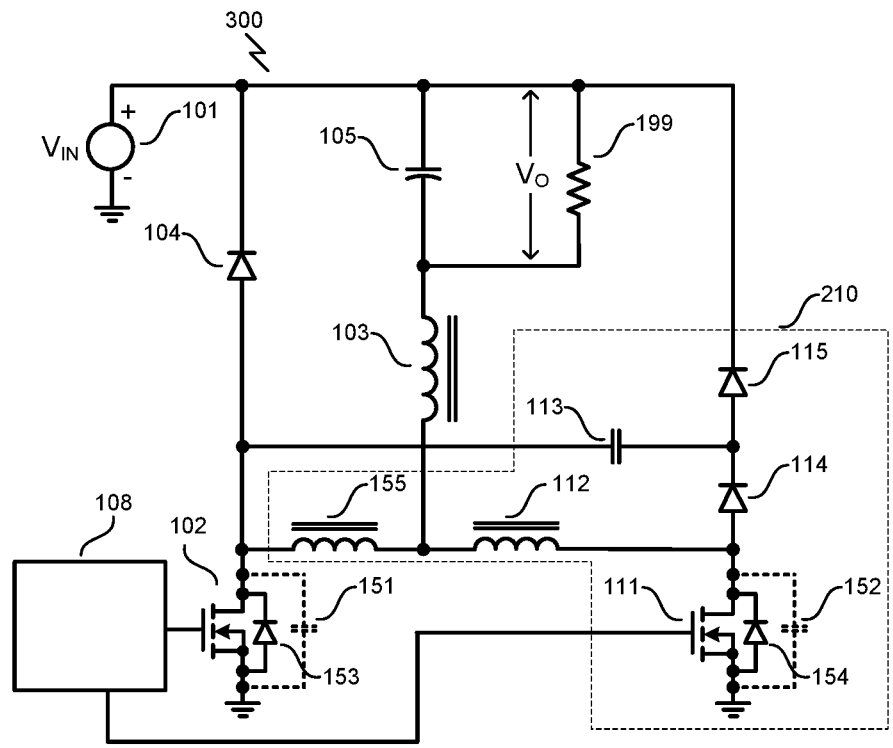
FIG. 4 depicts a buck converter according to an exemplary embodiment.

FIG. 4 depicts a buck converter 300 according to an exemplary embodiment that includes an active snubber network 210. The converter 300 of the exemplary embodiment includes all elements of the converter 200 of FIG. 2. The active snubber network 210 of the current exemplary embodiment includes all elements of the active snubber network 110 of FIG. 2, but the active snubber network 210 of the current exemplary embodiment additionally includes a third inductor 155.

Figure 5:
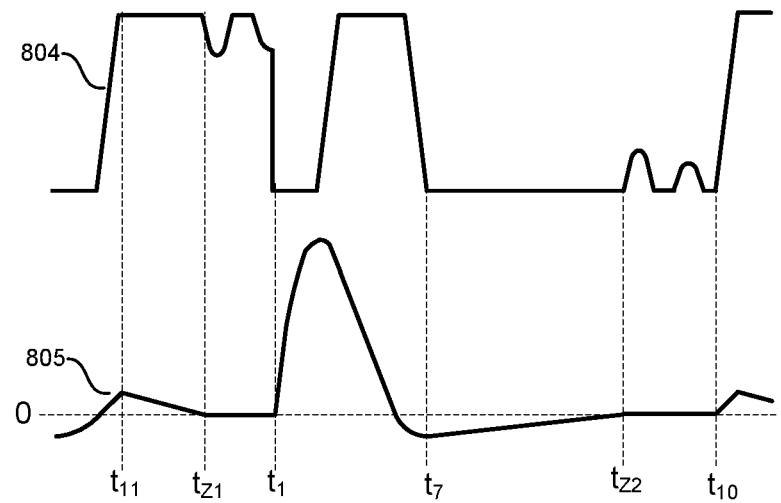
FIG. 5 depicts a waveform diagram illustrating the operation of the buck converter of FIG. 4 according to an exemplary embodiment.

Operation of the converter 300 of FIG. 4 can be illustrated by the waveform diagram in FIG. 5, which includes: a drain voltage waveform 804 of the auxiliary switch 111; and a current waveform 805 of the second inductor 112. Designations of the time moments $t_1$, $t_7$, $t_{10}$, and $t_{11}$ are equivalent to the corresponding time moments of FIG. 3.

At the moment $t_{11}$, the inductors 103, 112, and 155 form an inductive voltage divider coupled to the load 199 via the diodes 104, 114, and 115. The voltage at the inductor 112 equals the voltage at the inductor 155. Hence, the current 805 in the inductor 112 starts ramping down.

At the moment $t_{Z1}$, the current 805 reaches zero, and the diode 114 becomes reverse-biased. The voltage 804 at the switch 111 oscillates.

At the moment $t_1$, the switch 111 turns on without power loss due to the soft reverse recovery of the diode 114. The switch 111 may be turned on in an oscillation valley of the voltage 804 to minimize power loss due to discharging its output capacitance 152.

At the moment $t_7$, the inductors 103, 112, and 155 form an inductive voltage divider coupled to the input voltage source 101 via the switch 102, the body diode 154, and the output smoothing capacitor 105. The voltage at the inductor 112 equals to the voltage at the inductor 155. Hence, the current 805 in the inductor 102 starts ramping up.

At the moment $t_{Z2}$, the current 805 reaches zero, and the body diode 154 becomes reverse-biased. The voltage 804 at the switch 111 oscillates.

At the moment $t_{10}$, the switch 102 turns off. No residual current flows in the inductor 112.

Figure 6:
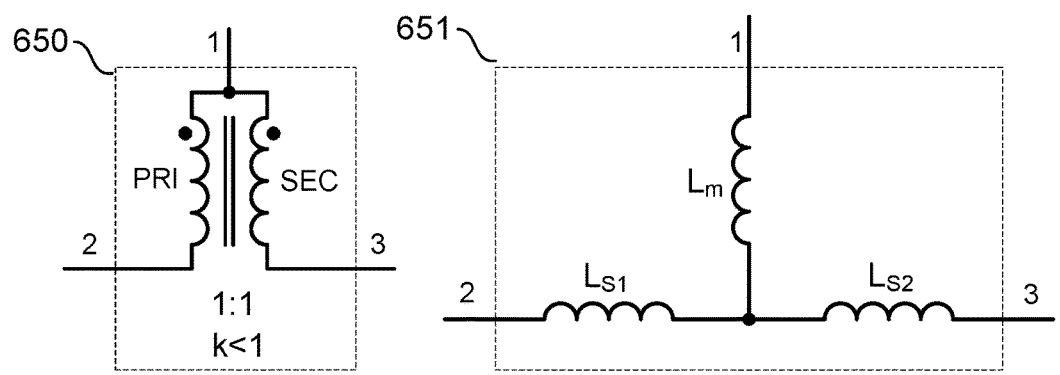
FIG. 6 depicts a coupled inductor that may be used in conjunction with the buck converter of FIG. 4 according to an exemplary embodiment.

FIG. 6 shows a coupled inductor 650 of the present invention having three terminals: 1, 2, and 3. The coupled inductor 650 may include a primary winding PRI and a secondary winding SEC wired in series in opposite polarity, having a substantially unity turn ratio and a coupling coefficient k less than 1. FIG. 6 also depicts an equivalent circuit 651 of the coupled inductor 650, having three terminals: 1, 2, and 3, correspondingly. The equivalent circuit may include: an inductance $L_m$ representing magnetizing inductance of the windings PRI and SEC; an inductance $L_{S1}$ representing leakage inductance of the winding PRI; and an inductance $L_{S2}$ representing leakage inductance of the winding SEC.

The coupled inductor 650 may be adopted in the buck converter 300 of FIG. 4, wherein the inductances $L_m$, $L_{S1}$, and $L_{S2}$ of its equivalent circuit 651 serve the functions of the inductors 103, 155, and 112, respectively.

Figure 7:
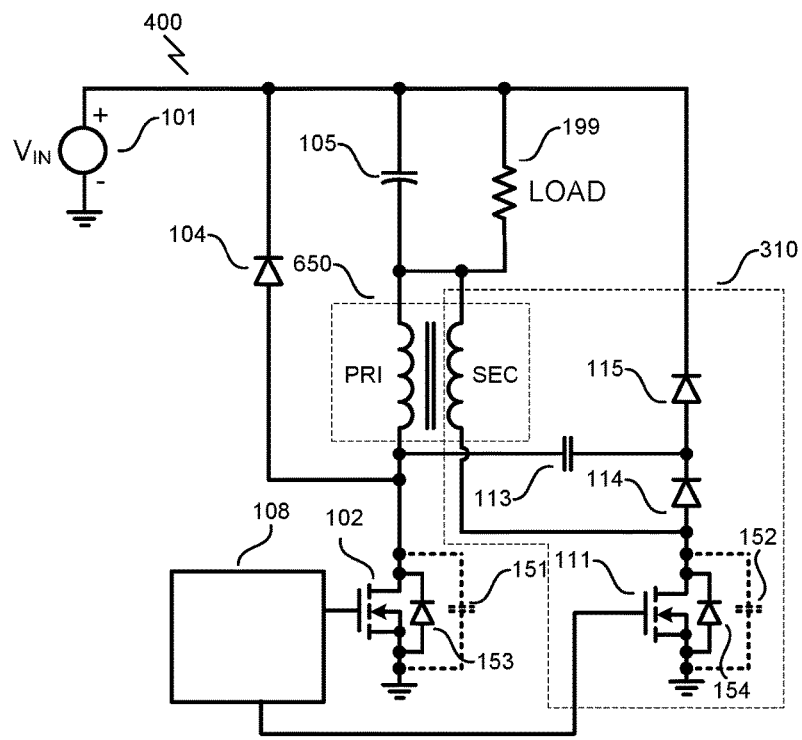
FIG. 7 depicts a buck converter incorporating the coupled inductor of FIG. 6 according to an exemplary embodiment.

FIG. 7 depicts a buck converter 400 according to an exemplary embodiment. Buck converter 400 of the present exemplary embodiment is identical to the buck converter 300 of FIG. 4, except that inductors 103, 155, and 112 have been replaced with the coupled inductor 650 of FIG. 6. The converter 400 is functionally equivalent to the converter 300 of FIG. 4.

Figure 8:
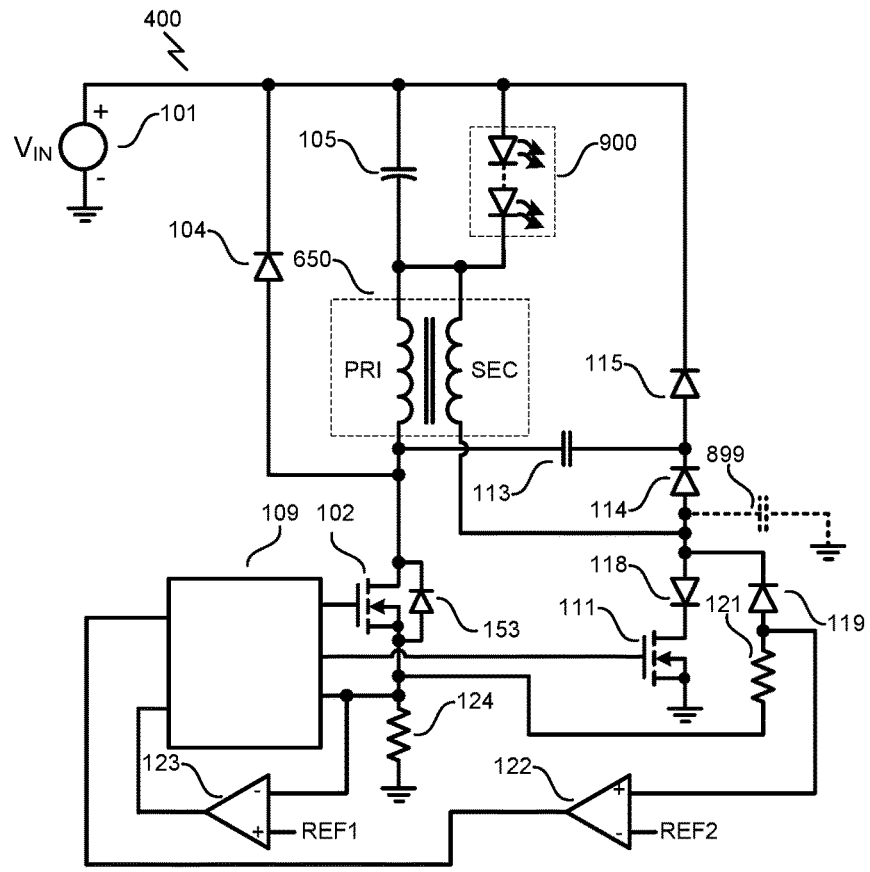
FIG. 8 depicts a buck converter according to another exemplary embodiment.

FIG. 8 depicts a buck converter 400 of FIG. 7 adapted to power a string 900 of light-emitting diodes (LED) at a controlled current, according to an exemplary embodiment. The converter 400 may include a first current sense resistor 124; a first comparator 123 receiving a first reference signal REF1; a blocking diode 118; a clamp diode 119; a second current sense resistor 121; and a second comparator 122 receiving a second reference signal REF2. A capacitance 899 represents total parasitic capacitance at the winding SEC. In the converter 400 of the exemplary embodiment of FIG. 8, the control circuit 108 of FIG. 7 is replaced by a control circuit 109 for turning the switches 102 and 111 on and off repeatedly at a high frequency rate. The control circuit 109 may also include: an input for receiving a voltage signal from the first current sense resistor 124; an input for receiving the output signal of the first comparator 123; and an input for receiving the output signal of the second comparator 122. An input of the first comparator 123 is also coupled to the first sense resistor 124. An input of the second comparator 122 is coupled to the second sense resistor 121. The second sense resistor 121 is coupled to the first sense resistor 124.

Figure 9:
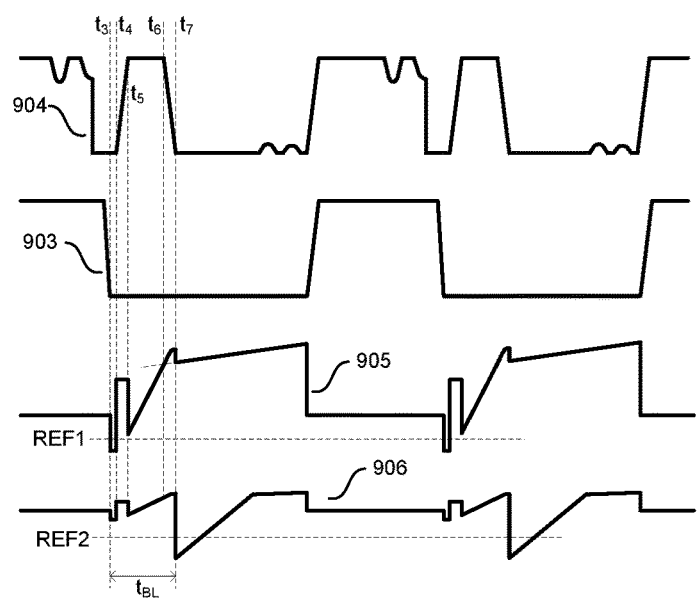
FIG. 9 depicts a waveform diagram illustrating the operation of the buck converter of FIG. 8 according to an exemplary embodiment.

Operation of the converter 400 of FIG. 8 can be illustrated by the waveform diagram in FIG. 9, which includes: a voltage waveform 904 at the anode terminal of the diode 118; a drain voltage waveform 903 of the control switch 102; a current sense voltage waveform 905 at the first sense resistor 124 referenced to the level REF1; and a current sense voltage waveform 906 at the first sense resistor 124 referenced to the level REF2. The voltage 906 is a superposition of the voltage 905 and a voltage drop at the second sense resistor 121. Designation of the time moments $t_3$, $t_4$, $t_5$, $t_6$, and $t_7$ is equivalent to the corresponding time moments of FIG. 3.

In operation, the control circuit 109 regulates constant current in the LED string 900 by modulating the duty ratio of the switch 102 in accordance with the sense voltage 905. The control circuit 109 ignores the sense voltage 905 for the duration of a leading-edge blanking delay $t_{BL}$ ending at or after the moment $t_7$.

At the moment $t_3$, the windings PRI and SEC of the coupled inductor 650 become connected together via the conducting auxiliary switch 111, the blocking diode 118, and the body diode 153 of the switch 102. The sense voltage 905 becomes negative, reflecting conduction of the body diode 153. When the first comparator 123 detects the sense voltage 905 falling below the reference level REF1, the control circuit 109 turns the switch 102 on at zero voltage.

Immediately, at the moment $t_4$, the control circuit 109 turns the switch 111 off. The voltage 904 at the anode of diode 118 ramps up from zero to $V_{IN}$ at a slew rate dictated by the value of the capacitor 113. The charge current of the capacitor 113 is reflected in the current sense voltage 905 as a positive leading-edge spike.

At the moment $t_5$, the diode 115 conducts, returning leakage energy stored in the coupled inductor 650 back to the input source 101 via the winding SEC. As the current in the winding SEC ramps down, the sense voltage 905 ramps up.

At the moment $t_6$, the current in the winding SEC reverses its direction, and the diodes 114 and 115 turn off. The parasitic capacitance 899 begins discharging from $V_{IN}$ to zero, while the current in the winding SEC swings negative. This negative current is reflected as an overshoot of the sense voltage 905.

At the moment $t_7$, the clamp diode 119 conducts. The winding SEC becomes coupled to the switch 102 directly via the diode 119, bypassing the sense resistor 124. The overshoot of the sense voltage 905 terminates.

At the same time moment $t_7$, the second current sense resistor 121 develops a negative voltage drop reflecting the current in the diode 119. The sense voltage 906 falls below the reference level REF2, and the second comparator 122 triggers. The leading-edge blanking delay $t_{BL}$ of the control circuit 109 terminates.

Although the inventive concepts of the present disclosure have been described and illustrated with respect to exemplary embodiments thereof, it is not limited to the exemplary embodiments disclosed herein and modifications may be made therein without departing from the scope of the inventive concepts.

What is claimed is:

1. A buck converter circuit comprising:
   a first inductor;
   a smoothing capacitor coupled to the first inductor;
   a rectifier diode coupled in parallel with the first inductor and the smoothing capacitor;
   a control switch coupled to the first inductor;
   a control circuit configured to turn the control switch off and on repeatedly at a high frequency rate; and
   a snubber network coupled to the first inductor and the control circuit, the snubber network comprising:
      second and third inductors connected in series, wherein one terminal of the first inductor is connected to a node connecting the second and third inductors; and
      an auxiliary switch connected to the control circuit;
      wherein a first terminal of the second inductor that is not connected to the node is coupled to the control switch, and a first terminal of the third inductor that is not connected to the node is coupled to the auxiliary switch.

2. The buck converter circuit of claim 1, wherein the first terminal of the second inductor is connected to the anode of the rectifier diode.

3. The buck converter circuit of claim 1, wherein the snubber network further comprises a snubber capacitor;
   wherein a first terminal of the snubber capacitor is connected to the first terminal of the second inductor, and a second terminal of the snubber capacitor is connected to the first terminal of the third inductor.

4. The buck converter circuit of claim 3, wherein the snubber network further comprises first and second auxiliary rectifier diodes connected in series with the auxiliary switch; and wherein the second terminal of the snubber capacitor is connected to a node between the first and second auxiliary rectifier diodes.

5. The buck converter circuit of claim 4, wherein the second terminal of the snubber capacitor is connected to the first terminal of the third inductor via the first auxiliary rectifier diode.

6. A buck converter circuit comprising:
- a coupled inductor having a primary winding and a secondary winding wired in series in opposite polarity;
- a smoothing capacitor coupled to the coupled inductor;
- a rectifier diode coupled in parallel with the coupled inductor and the smoothing capacitor;
- a control switch coupled to the coupled inductor;
- a control circuit configured to turn the control switch off and on repeatedly at a high frequency rate; and
- a snubber network coupled to the coupled inductor and the control circuit, the snubber network comprising an auxiliary switch connected to the control circuit and to the secondary winding of the coupled inductor.

7. The buck converter circuit of claim 6, wherein the snubber network further comprises a snubber capacitor;
wherein a first terminal of the snubber capacitor is connected to the primary winding of the coupled inductor, and a second terminal of the snubber capacitor is connected to the auxiliary switch.

8. The buck converter circuit of claim 7, wherein the snubber network further comprises first and second auxiliary rectifier diodes connected in series with the auxiliary switch; and wherein the second terminal of the snubber capacitor is connected to a node between the first and second auxiliary rectifier diodes.

9. The buck converter circuit of claim 8, wherein the second terminal of the snubber capacitor is connected to the auxiliary switch via the first auxiliary rectifier diode.

10. The buck converter circuit of claim 6, further comprising:
- a first current sense resistor coupled to the control switch;
- a first comparator coupled to the first current sense resistor and the control circuit, said first comparator receiving a first reference signal as an input;
- a blocking diode coupled to the auxiliary switch and a secondary winding of the coupled inductor;
- a clamp diode coupled to the secondary winding of the coupled inductor;
- a second current sense resistor coupled to the clamp diode; and
- a second comparator coupled to the second current sense resistor and the control circuit, said second comparator receiving a second reference signal as an input.

11. The buck converter circuit of claim 10, wherein the second current sense resistor is coupled to the first current sense resistor.

12. The buck converter circuit of claim 10, wherein the control circuit is configured to receive as inputs a voltage signal from the first current sense resistor, an output signal from the first comparator, and an output signal from the second comparator.

* * * * *